United States Patent
Elfes et al.

[11] 3,910,355
[45] Oct. 7, 1975

[54] SWAY CONTROL DEVICE

[75] Inventors: Lee E. Elfes, Bloomfield Hills; Otto Mueller, Jr., Detroit, both of Mich.; Jean J. Lasoen, Villepreux, France

[73] Assignee: Massey-Ferguson Inc., Detroit, Mich.

[22] Filed: Aug. 30, 1973

[21] Appl. No.: 392,912

[52] U.S. Cl. ............................. 172/450; 280/474
[51] Int. Cl. .......................................... A01b 59/043
[58] Field of Search ........... 172/450, 449, 457, 501; 280/497, 474

[56]  References Cited
  UNITED STATES PATENTS

| | | | |
|---|---|---|---|
| 2,935,147 | 5/1960 | Edman et al. | 172/450 |
| 2,987,126 | 6/1961 | Horney | 172/450 |
| 3,047,076 | 7/1962 | Wier et al. | 172/450 |
| 3,627,060 | 12/1971 | Lemmon | 172/450 |
| 3,709,304 | 1/1973 | Haupt | 172/450 |
| 3,721,302 | 3/1973 | Buchmuller et al. | 172/450 |

*Primary Examiner*—Stephen C. Pellegrino
*Attorney, Agent, or Firm*—Robert L. Farris

[57] ABSTRACT

A tractor hitch has removable sway control blocks arranged to cooperate with rub blocks adjustably mounted on pivoted draft links, the sway blocks have guide surfaces located to contact the rub blocks when the links are in a raised transport position to prevent lateral sway and other guide surfaces arranged to contact the draft links to permit limited lateral sway when the links are in a lowered position. A second set of removable sway blocks when attached has a guide surface located to contact the rub blocks to prevent lateral sway of the links in their lowered position.

6 Claims, 10 Drawing Figures

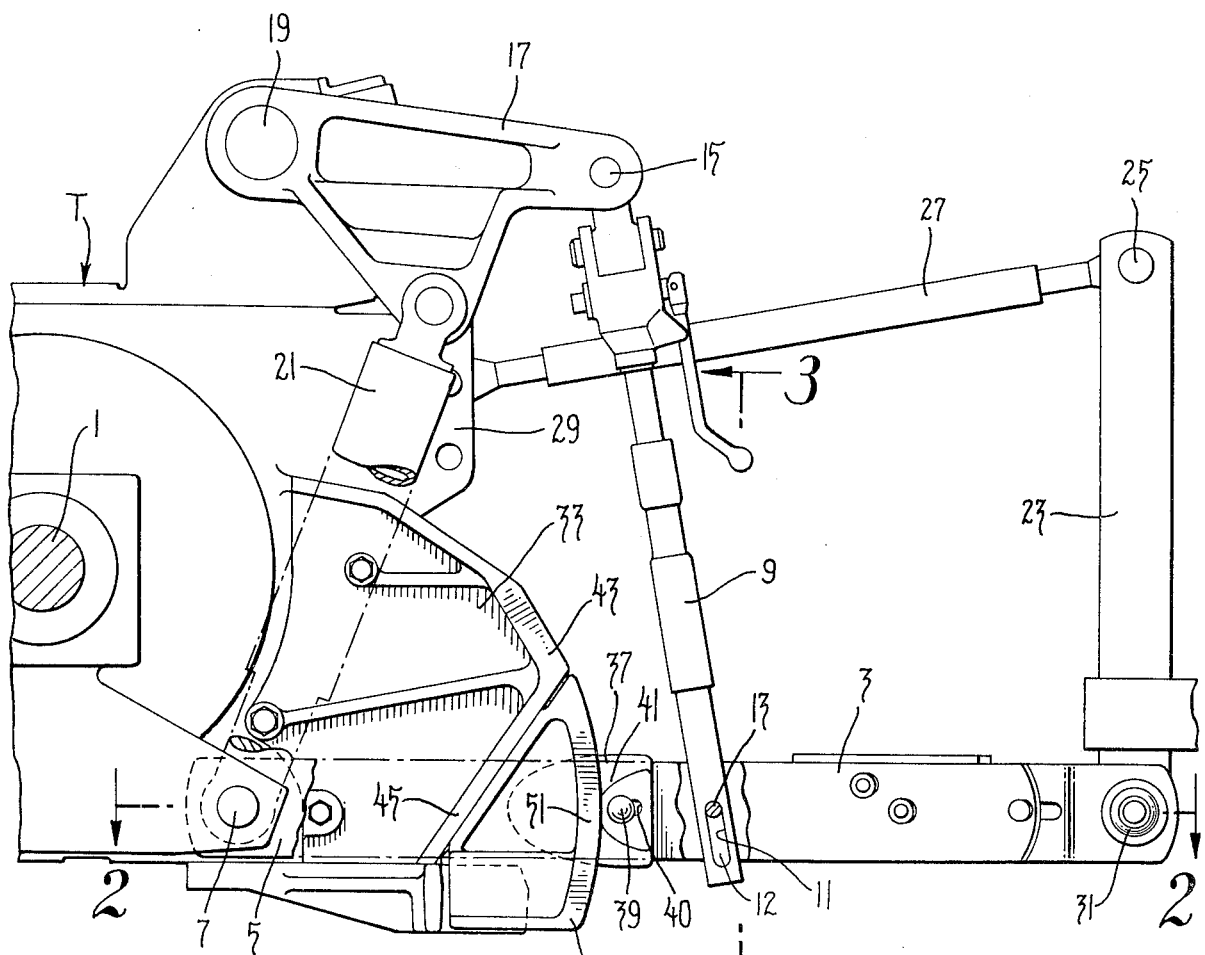
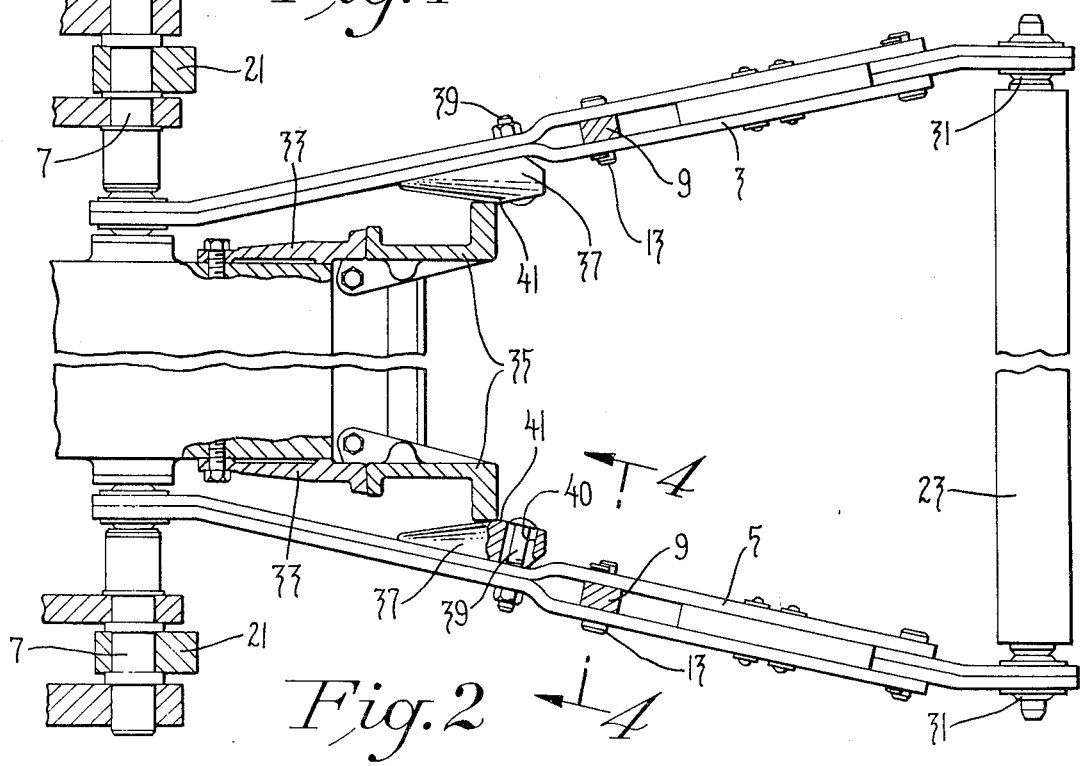

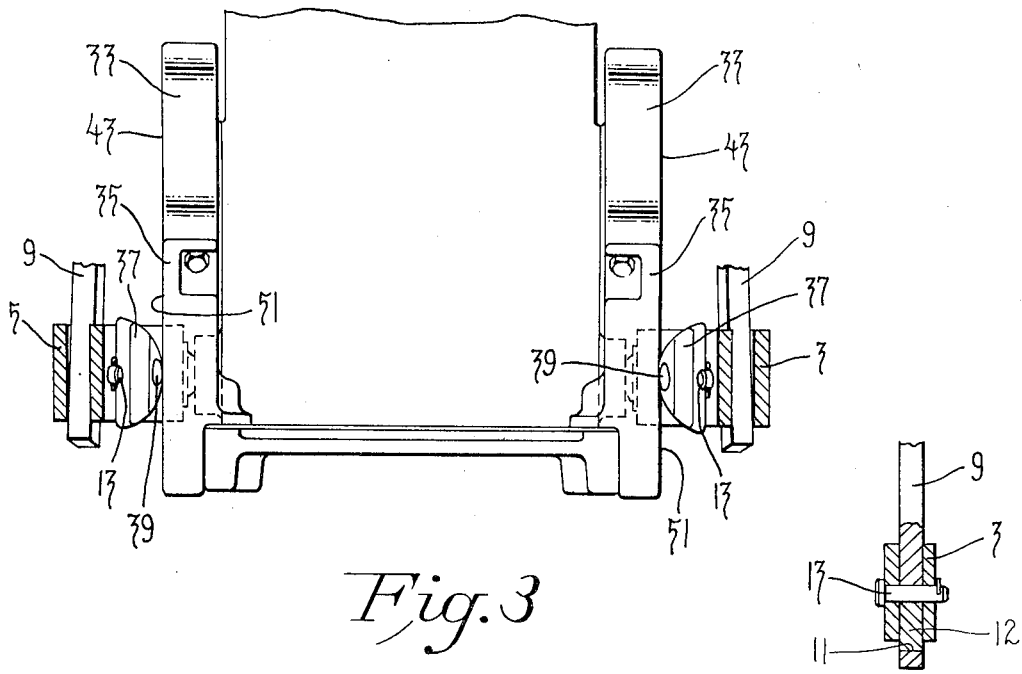
Fig.3
Fig.4
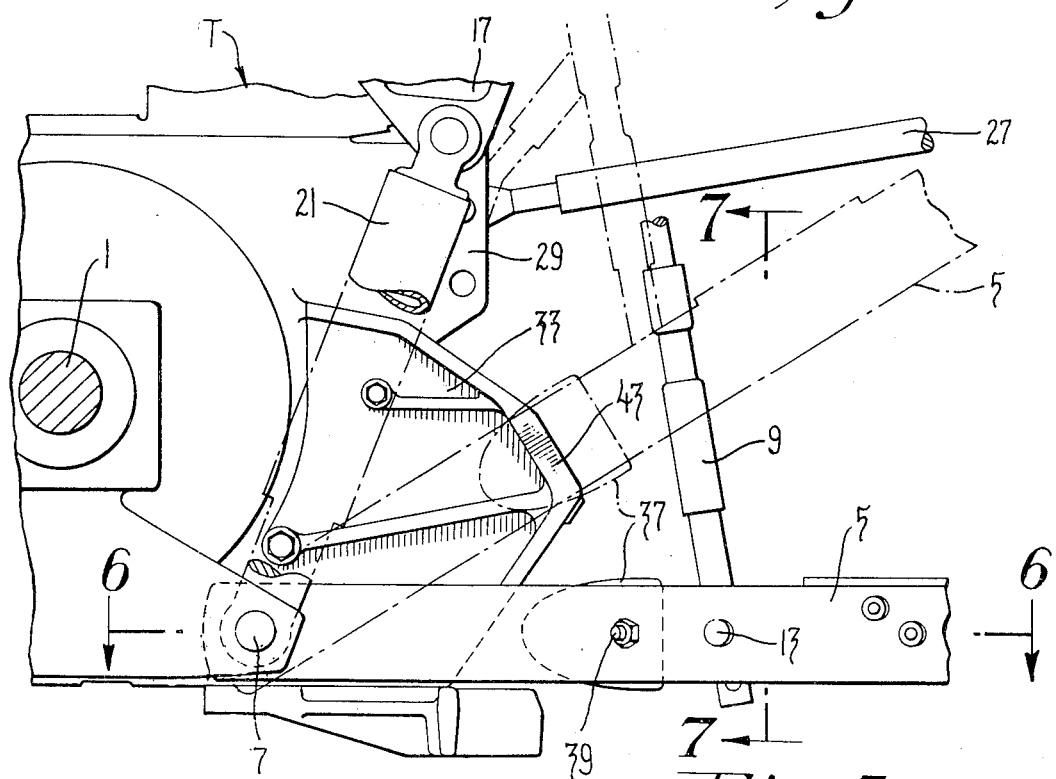
Fig.5

SWAY CONTROL DEVICE

This invention relates generally to tractor hitches and more particularly to the type of hitch wherein the hitch has means for selectively preventing lateral sway during operation and/or during transport of the implement.

Farm implements that are carried by an agricultural tractor have become increasingly large. some of these implements are such that lateral sway of the implement relative to the tractor is desirable as where the implement is in the ground and follows a contour. In other cases, such side sway is undesirable. In any instance, sway of the implement when it is in a raised transport position is undesirable for safe and stable operation. Various types of sway limiting devices have been proposed which involve the use of removable rub means carried by the draft links acting in cooperation with fixed sway preventing means on the tractor.

By having certain portions of the fixed means separately removable, in other words making it in two parts, a construction is achieved that prevents any sway when both removable means are in place, permits sway in lowered operating position and prevents sway in raised position when only one portion is removed and permits sway in any position when both portions are removed.

It is the object of this invention to provide a hitch having sway control means including a plurality of removable means carried by the tractor which can be selectively removed to afford different types of effective sway control.

This and other objects and advantages will be readily apparent from the following description and accompanying drawings in which:

FIG. 1 is a side elevational view of a portion of a rear tractor having the subject sway control means and showing the removable sway permitting means in place.

FIG. 2 is a sectional view taken along the lines 2—2 of FIG. 1;

FIG. 3 is a rear sectional view taken along the lines 3—3 of FIG. 1;

FIG. 4 is a top sectional view taken on the line 4—4 of FIG. 2;

FIG. 5 is a side elevational view similar to FIG. 1 showing the removable portion of the sway preventing means removed;

Figure 6:
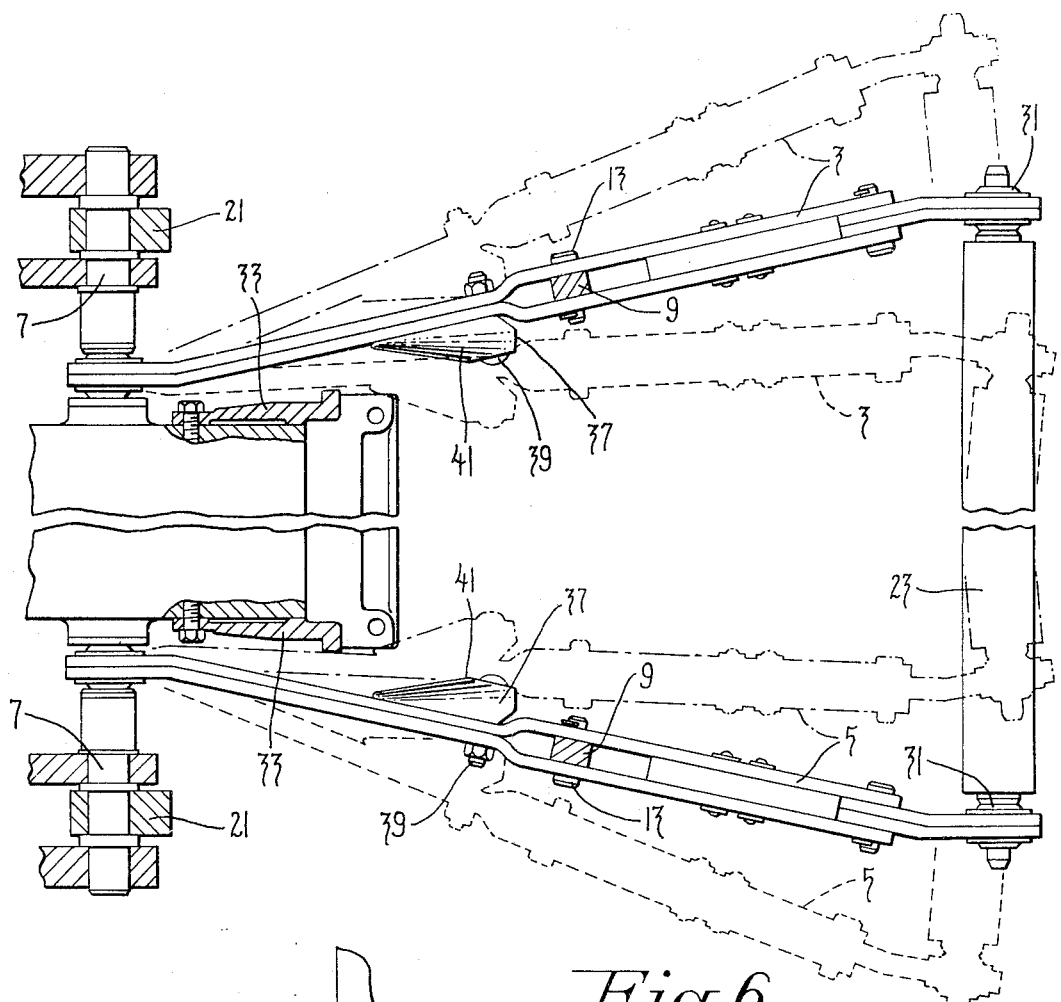
FIG. 6 is a sectional view similar to FIG. 2 taken along line 6—6 of FIG. 5.

Referring now to the drawings, a tractor generally indicated T having a rear axle shaft 1 carries at the rear end a pair of draft links 3 and 5 which are pivoted on a common axis 7 on the tractor. The links are raised by means of lift links 9 which are pivotally connected at their lower ends to the draft links by pins 13 extending through the respective slots 11 and held in position by blocks 12. The upper ends of the lift links 9 are connected at 15 to a lift lever arm 17 pivoted at 19 and connected to a hydraulic cylinder 21 to be raised and lowered. The lower end of the cylinders 21 are pivoted on the same axis 7 as the lower draft links 3 and 5.

The tractor is shown connected to a mast 23 of an implement, the rest of which is not shown. The upper end of the mast 23 is pivotally connected at 25 to the link 27 which forms the top link of a three point hitch. Link 27 is, in turn, attached to the housing 29 on the tractor. The implement mast is attached at its lower end to the draft links through ball coupling joints 31.

The sway control means includes a first pair of cast, or otherwise fabricated, fixed guide rail members 33 bolted on the tractor and a second pair of removable fabricated guide rail members 35 which are temporarily bolted on the first members 33. Cooperating sway control rub block members 37 are adjustably bolted to the draft links by bolts 39 passing through slots 40 in the members 37. The members 37 have a contoured surface 41 which is seen in FIG. 2 and FIG. 3, are tapered in both fore and aft and up and down directions. This provides for smoother rubbing action between the blocks 37 and rail members 33 and 35.

Figure 7:
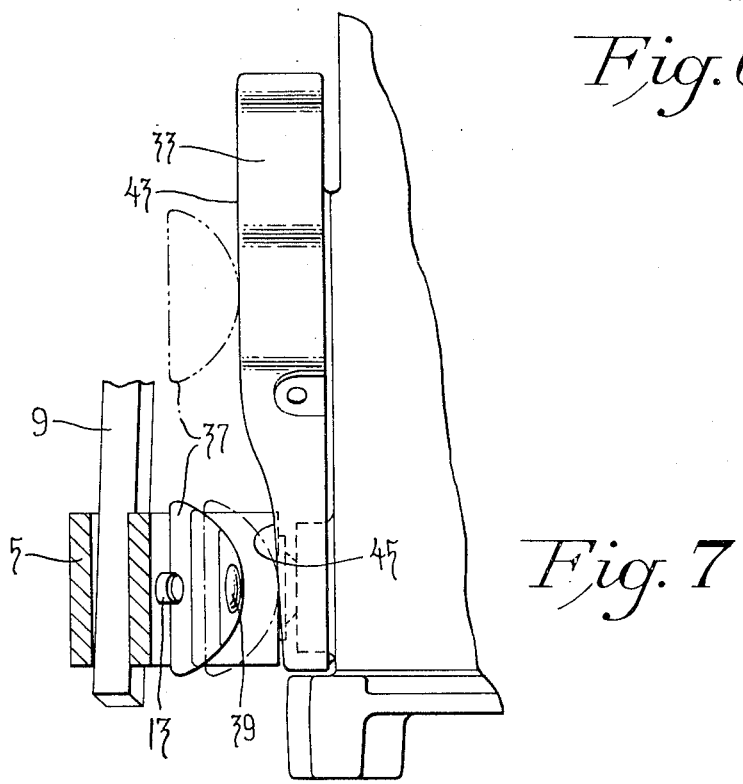
FIG. 7 is a sectional view taken along the line 7—7 of FIG. 5 showing the relative portions of the fixed and removable elements of the sway preventing mechanism.

The upper or first pair of sway control or guide rail members 33 include first outwardly facing guide rail surfaces 43 that extend vertically and are located radially outward from the axis of the draft links in a position to be contacted by the inner apex surface on the rub blocks member 37 when the links are fully raised to the transport position shown in dashed lines in FIGS. 5, 6 and 7.

The guide members 33 also have lower outwardly facing guide rail surfaces 45. The guide surfaces 45 are located on the edge of a reduced radius portion of the member 33 so that it is the inner sides of the draft links 3 and 5 that contact the surfaces 45 instead of the rub block members 37. This means that the total maximum sway of the links is determined not only by the difference between lateral spacing of surfaces 45 compared to the same spacing between surfaces 43 but also by the width of the rub block 37.

As the draft links are raised from their lower operating position of FIG. 1, initially the inner sides of the links are opposite the surface 45, then the forward thin edge of the rub block 37 contacts the surface 45. Further raising causes the contact point between the members to simultaneously move up the surface 45, which surface moves laterally outward to merge into the upper surface 43, and along the inner face of the rub block back from the thin forward end portion to the thicker rear end portion until the members reach the dashed line position shown in FIGS. 5 and 7.

When the lower sway block members 35 are attached as shown in FIGS. 1, 2 and 3, the rub blocks 37 contact the surfaces 51 on members 35 when the draft links are in their lower operative positions. The surfaces 51 together with surfaces 43 on members 33 form a pair of continuous vertical guide surfaces for contact by rub blocks 37 maintaining the draft links in a central non-sway lateral position regardless of the position of the draft links.

With the lower members either attached or not attached, the rub blocks 37 can be adjusted to a zero sway position by loosening the bolts 39 and moving the blocks along the links until both blocks are in contact with the guide rail surface 43 on member 33 or 51 on member 35.

In order to accommodate implements which have different category sizes, there can be provided a different set of rub block members 37 that have a different thickness to provide a different spacing between the links 3 when the rub blocks are in contact with the sway block members 35 and 33.

Figure 8:
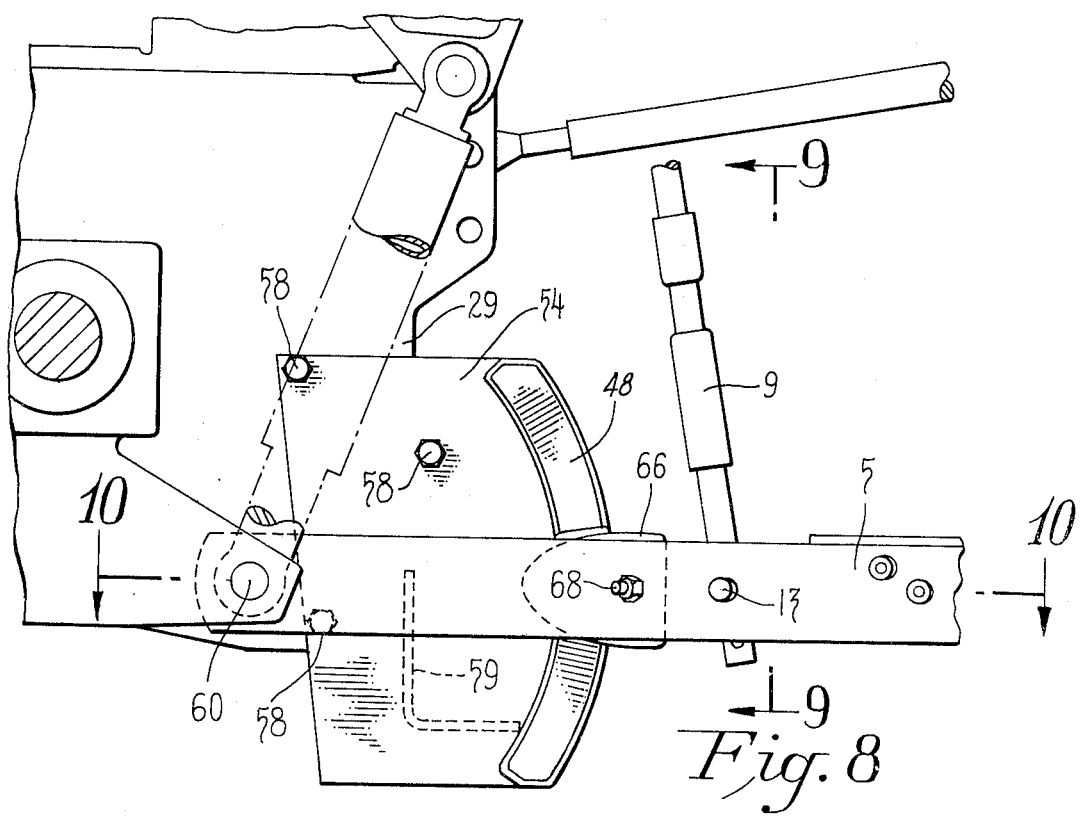
FIG. 8 is a side elevational view of the rear portion of a tractor and another embodiment of the invention with the removable sway permitting means in place.
Figure 9:
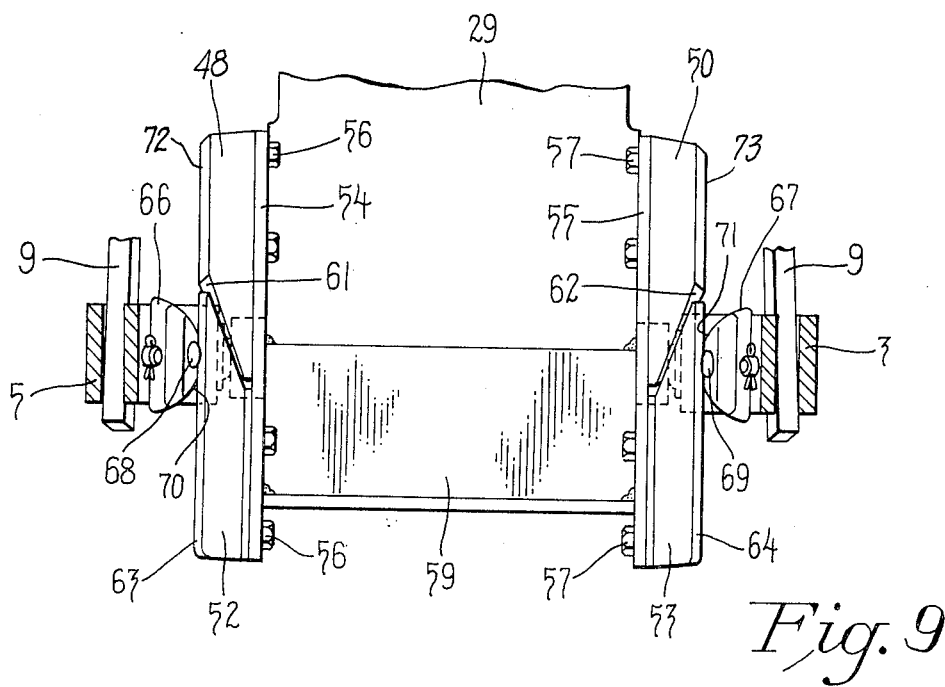
FIG. 9 is a rear sectional view taken along line 9—9 of FIG. 8.
Figure 10:
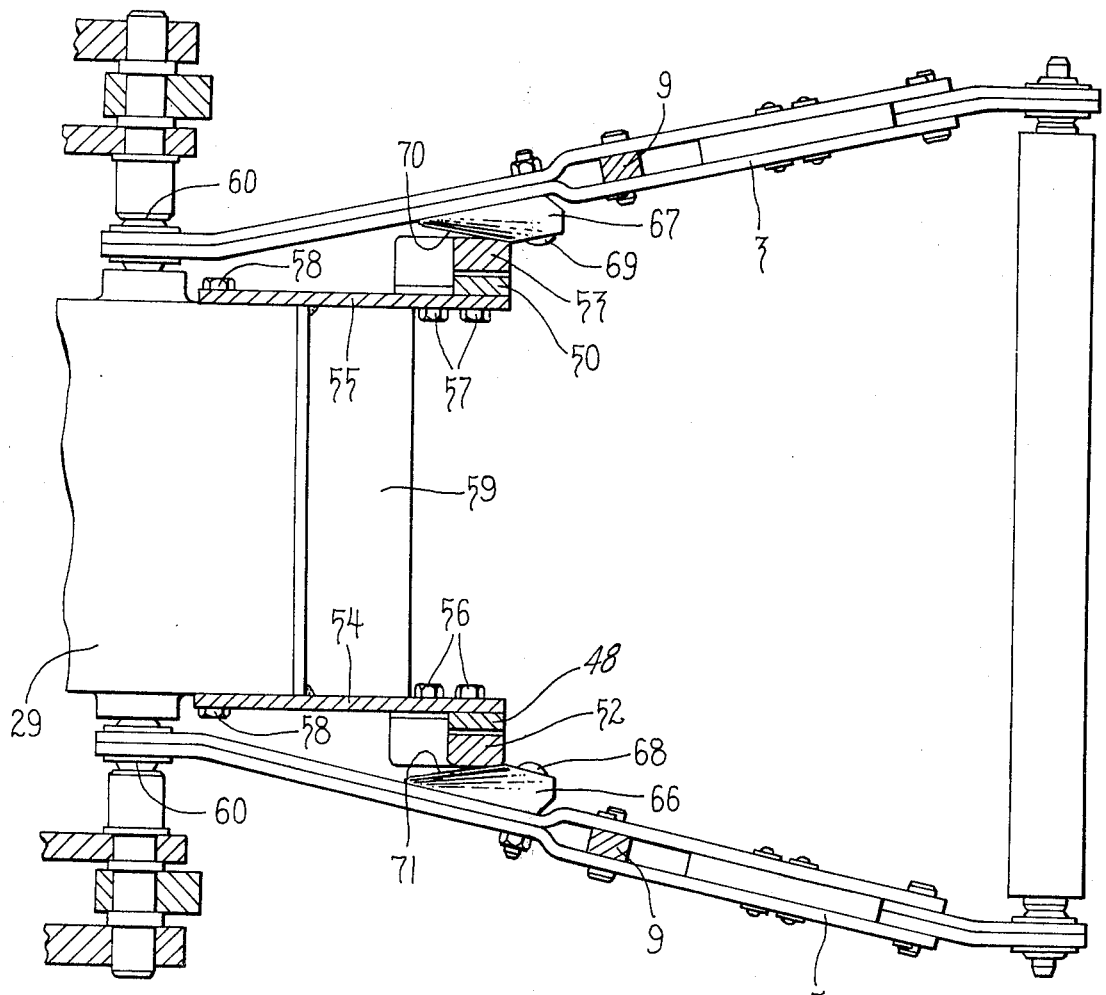
FIG. 10 is a top sectional view taken along line 10—10 of FIG. 8.

In FIGS. 8, 9 and 10 the upper guide rails 48, 50 and lower guide rails 52, 53 are removably mounted on plates 54, 55 by the bolts 56, 57, respectively. These plates are removably mounted on the housing 29 by bolts 58. The plates are further supported by the L-shaped beam 59, which is welded to the plates.

The guide rails are curved about the pivot 60 of the lower links 3, 5. The plates 54, 55 extend rearwardly supporting the rails which guide and hold the links through the rub blocks 66, 67.

The upper guide rails 50, 51 have sloped, wedge-shaped surfaces 61, 62 and the lower guide rails 52, 53 have sloped, wedge-shaped surfaces 63, 64. When the lower guide rails 52, 53 are removed, the sloped surfaces 61, 62 function as ramps on the rails 48, 50 and guide the rub blocks on to the surfaces 72, 73.

The rub blocks 66, 67 are fastened to the links 3, 5 by the bolts and nuts 68, 69 and the surfaces 70, 71 engage the rails 50, 51 and 52, 53, respectively.

It will be seen that there has been provided a simple yet efficient construction for selectively preventing lateral sway of an implement carried on a tractor hitch. Changes and modifications from the preferred embodiment shown and described will be obvious and such changes and modifications are deemed to be within the scope of the invention which is limited only by the following claims:

We claim:

1. A tractor hitch including a pair of laterally spaced draft links pivotally mounted on a tractor frame for up and down vertical movement about a transverse axis between a lower operative position and an upper transport position, and for lateral sway in a plane passing through said axis, a first pair of laterally spaced sway blocks mounted on said frame, a second pair of laterally spaced sway blocks removably mounted on said frame, means for removably attaching said second pair of sway blocks to said frame, said first pair of sway blocks having first upper outwardly facing vertical surfaces spaced apart a first distance and located on a first predetermined radius from the transverse axis and having second lower outwardly facing vertical surfaces at said operative position spaced apart a second distance substantially less than said first distance and located a distance from said transverse axis less than said predetermined radius, said second pair of sway blocks having outwardly facing vertical surfaces spaced apart when mounted on said frame a distance equal to said first distance and located a distance from said transverse axis equal to said predetermined radius and being at said operative position, rub means on said links located a distance from said transverse axis equal to said transverse axis equal to said predetermined radius, whereby the rub means on said links are not opposite said second lower outwardly facing, surfaces in the lower operative position of said links but are opposite the said first upper surfaces in the upper transport position of said links, and whereby the rub means on said links in the operative position are opposite the vertical surfaces on said second pair of sway blocks when said second pair of sway blocks are attached to said frame and said links are in said lower operative position. 8

2. The tractor hitch of claim 1 wherein said draft links carrying the rub means move in vertical planes that converge and wherein said rub means are longitudinally movable on said links whereby the distance from said transverse axis to said rub means may be varied.

3. The tractor hitch of claim 1 wherein said links each comprise a pair of inner and outer formed longitudinally extending plates secured together, said rub means adjustably secured to the inner plates of each link.

4. The tractor hitch of claim 1 wherein said first pair of sway blocks are attached to the sides of said tractor frame and said second pair of sway blocks are secured to the first pair of sway blocks.

5. The tractor hitch of claim 1 wherein lift means are connected to each link to raise the same, said lift means comprising a pair of lift cylinders pivotally mounted on said transverse axis and pivotally connected to a pair of spaced pivotally mounted levers, lift links pivotally connected at one end to said levers and at their other end to said draft links.

6. The tractor hitch of claim 1 wherein the outer ends of said links are connected by a lateral member which maintains the links a fixed distance apart.

* * * * *